United States Patent [19]

Yamamoto et al.

[11] 4,373,895

[45] Feb. 15, 1983

[54] EXTRUSION DIE AND METHOD FOR PRODUCING EXTRUSION DIE FOR FORMING A HONEYCOMB STRUCTURE

[75] Inventors: Shinichi Yamamoto, Takahama; Toshihiko Ito, Aichi, both of Japan

[73] Assignee: Nippon Soken, Inc., Nishio, Japan

[21] Appl. No.: 186,268

[22] Filed: Sep. 11, 1980

[30] Foreign Application Priority Data

Sep. 12, 1979 [JP] Japan .................. 54-117626

[51] Int. Cl.³ ............................................. B29F 3/04
[52] U.S. Cl. ............................. 425/461; 29/163.5 R; 29/428; 29/527.1; 29/557; 29/558; 29/DIG. 26; 264/177 R; 264/209.1; 264/209.8; 425/197; 425/380; 425/382 R; 425/462; 425/467
[58] Field of Search ..................... 425/461–467, 425/380, 382 R, 197–199; 264/177 R, 209.1, 209.8; 29/527.1, 163.5 R, 428, DIG. 26, 557–558

[56] References Cited

U.S. PATENT DOCUMENTS

| | | | |
|---|---|---|---|
| 3,038,201 | 6/1962 | Harkenrider | 425/197 |
| 3,846,197 | 11/1974 | Wiley | 425/464 |
| 3,905,743 | 9/1975 | Bagley | 425/382 R |
| 4,041,597 | 8/1977 | Folmar et al. | 425/464 |
| 4,118,456 | 10/1978 | Blanding et al. | 425/464 |
| 4,163,640 | 8/1979 | Higuchi et al. | 425/466 |
| 4,178,145 | 12/1979 | Hamamoto et al. | 425/380 |
| 4,235,583 | 11/1980 | Reed | 425/464 |
| 4,242,075 | 12/1980 | Higuchi et al. | 425/463 |
| 4,243,370 | 1/1981 | Higuchi et al. | 425/462 |

*Primary Examiner*—Jeffery R. Thurlow
*Attorney, Agent, or Firm*—Cushman, Darby & Cushman

[57] ABSTRACT

Method for producing an extrusion die and resulting die for making a honeycomb structure provided with axially extending separate passages. Feed passages and interconnected pooling slots are formed in a metallic die body respectively from opposed end surfaces so as to be communicated with each other. A metallic plate is secured to the end surface provided with the interconnected pooling slots and formed in that plate to communicate with the pooling slots are narrower interconnected extrusion slots having the same shape and size as those of walls of the desired honeycomb structure.

49 Claims, 5 Drawing Figures

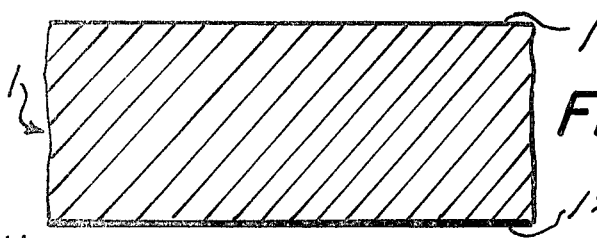
FIG.5a
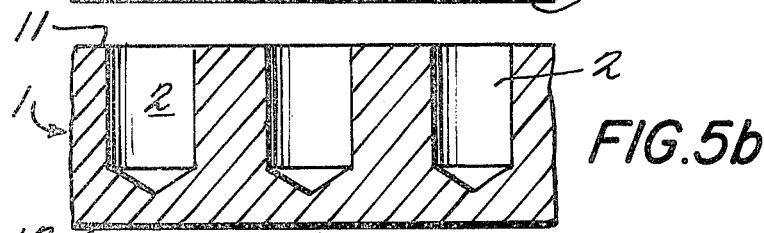
FIG.5b
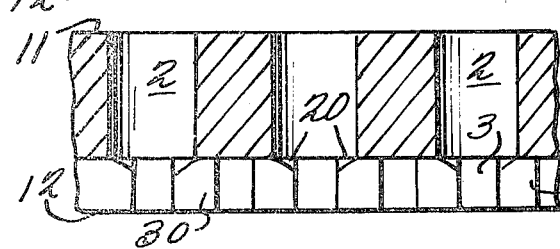
FIG.5c
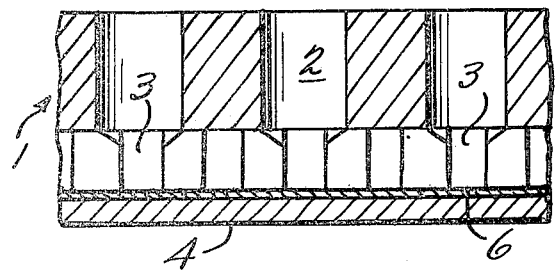
FIG.5f
FIG.5d
FIG.5e
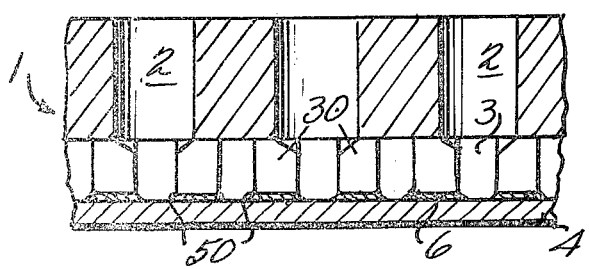
FIG.5g
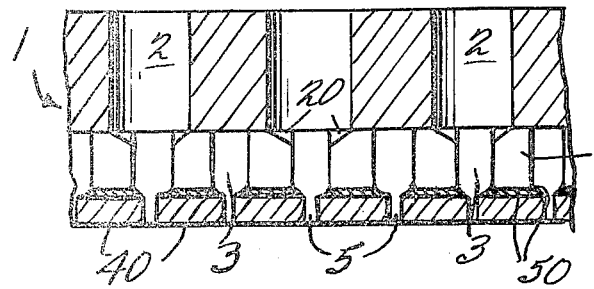
FIG.5h

EXTRUSION DIE AND METHOD FOR PRODUCING EXTRUSION DIE FOR FORMING A HONEYCOMB STRUCTURE

The present invention relates to a method of producing an extrusion die and to such a die which is especially useful to make a honeycomb structure for use as a catalyst carrier or support for purifying exhaust gases of an automobile or the like.

BACKGROUND OF THE PRESENT INVENTION

Exemplary conventional honeycomb structure extrusion dies and methods of making same are disclosed in U.S. Patents to Harkenrider U.S. Pat. Nos. 3,038,201 and 3,038,202, to Bagley U.S. Pat. Nos. 3,790,654 and 3,905,743 and to Benbow et al U.S. Pat. No. 3,824,196. In Harkenrider, a die body is provided with a large number of feed passages which are axially drilled from one end surface towards the other end surface separately, interconnected extrusion slots which are formed from the other end surface of the die body and have the same shape and size as those of the cross sectional shape of walls of an obtained honeycomb structure, and round pooling holes which are radially drilled in such positions as to connect the feed passages with the interconnected extrusion slots.

In the conventional extrusion die having the above described structure, an extrudable material which is supplied through the feed passages is temporally pooled in the round pooling holes and then the material is fed into the interconnected extrusion slots.

The extrusion die provided with the above described round pooling holes is generally made as follows:

Namely, a die body having the desired shape and size is prepared from a metallic block. Feed passages in large number are drilled in the die body from one end surface towards the other end surface in an axial direction. Interconnected round extrusion holes are formed from the other end surface towards one end surface. Round pooling holes are radially drilled from one side surface of the die body to the side surface opposed thereto so as to connect the feed passages and interconnected extrusion holes. All of the above passages and holes are formed in one single unitary metallic die body.

SUMMARY OF THE PRESENT INVENTION

The method of the present invention for forming an extrusion die for forming a honeycomb structure comprises the steps of preparing a die body provided with a large number of feed passages and interconnected pooling slots communicated with the feed passages, joining a metallic plate to the end surface of the die body, wherein the pooling slots are formed, and forming interconnected extrusion slots in the metallic plate so as to be communicated with the interconnected pooling slots.

One object of the present invention is to provide a novel extrusion die and method for producing same efficiently and precisely.

Another object of the present invention is to provide such a method and extrusion die in which pooling slots having a predetermined size and shape can be formed at predetermined positions without deviation.

Still another object of the present invention is to provide a method by which a durable extrusion die can be made by selecting a metallic material suitable for the extrusion portion thereof while the die body may be of different material.

Further object of the present invention is to provide a method for producing a useful and practical extrusion die.

DESCRIPTION OF THE DRAWINGS

Other objects and advantages of the invention will become apparent from the following detailed description of the present invention with reference to the accompanying drawings wherein:

FIGS. 5(a)–(h) show steps in a process according to the invention for producing the extrusion die shown in FIGS. 1-3.

DETAILED DESCRIPTION OF THE PRESENT INVENTION

Figure 1:
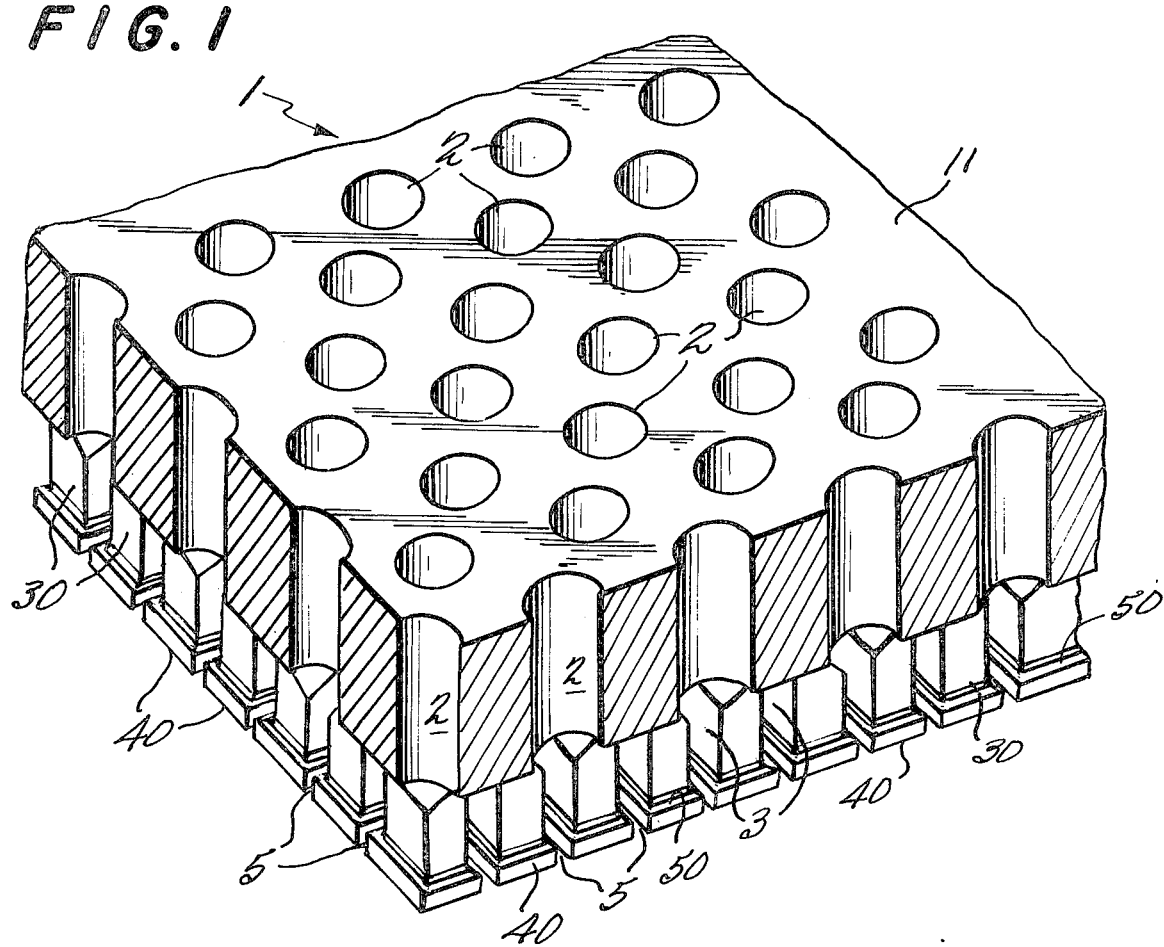
FIG. 1 is a partially sectioned perspective view of an extrusion die of the present invention.
Figure 2:
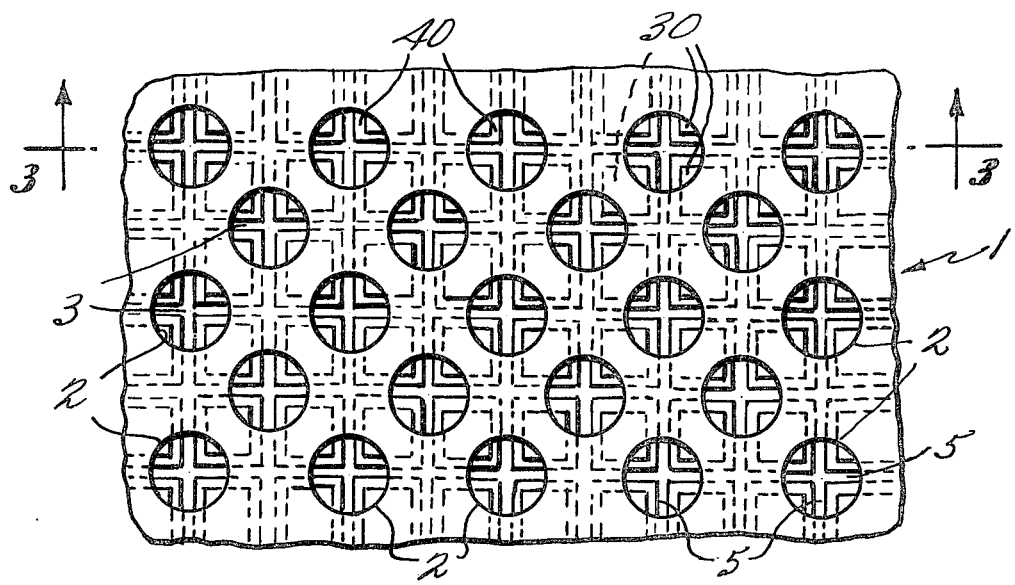
FIG. 2 is a plan view of a portion of the extrusion die shown in FIG. 1.
Figure 3:
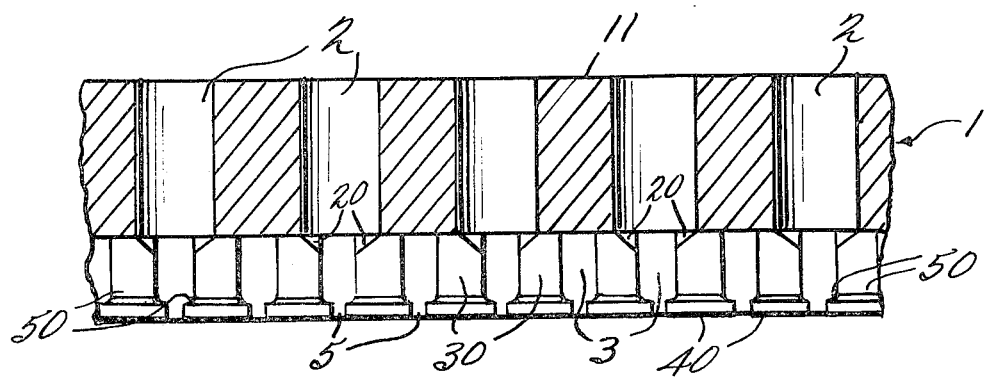
FIG. 3 is a cross-sectional view taken along the line III—III of FIG. 2.

As shown in FIGS. 1 to 3, die body 1 contains numerous discrete feed passageways 2 each having a circular cross section and extending axially from one end surface 11 towards an opposed end surface 12 (see also FIG. 5c) in parallel with one another at predetermined intervals to a predetermined depth.

Figure 4:
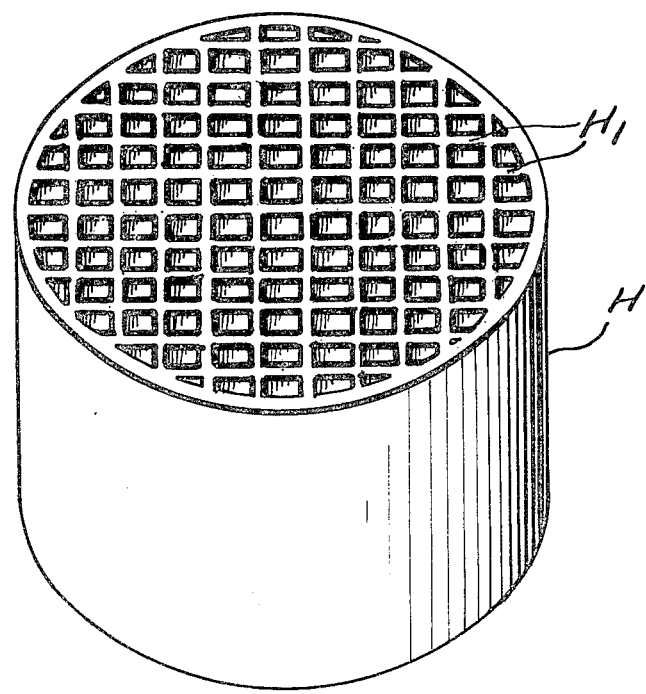
FIG. 4 is a perspective view of a honeycomb structure obtained by means of the extrusion die of the present invention.

From the other end surface 12 towards the opposed end surface 11 of the die body 1, a rectangular grid network of interconnected pooling slots 3 is formed by a multiplicity of discrete pins or columns 30. The interconnected pooling slots 3 are of uniform width and have a shape or configuration corresponding to that of the cross-section of walls $H_1$ of the honeycomb structure H as shown in FIG. 4, although the width of slots 3 is larger than the thickness of the walls $H_1$. Slots 3 run transverse to passageways 2.

Each of the inner ends of feed passageways 2 is tapered at 20 and merges into the inner end of a slot 3. It will be noted that the passageways 2 are communicated to pooling slots 3 at alternate intersections in both coordinate directions of the grid network of interconnected pooling slots 3 as best shown in FIG. 2.

To the other end surface 12 of the die body 1, a large number of discrete metallic platelets 40 are secured by brazing, for example.

Between each of the metallic plate pieces 40 is an extrusion slot 5 having the same shape and size as the cross-sectional shape of the respective wall $H_1$ of the honeycomb structure H. Extrusion slots 5 are narrower than pooling slots 3 but respectively register therewith and form a similar grid network of interconnected extrusion slots 5 superposing the interconnected pooling slots 3 so as to be communicated with each other via a small converging transition 50.

A method for producing such an extrusion die for forming a honeycomb structure is now explained in reference to FIGS. 5(a)–(h).

At first, as shown in FIG. 5(a), a metallic block (for example, alloy tool steel) is formed into the die body 1 by a lathe or the like to have opposed end surfaces 11 and 12 and a shape or configuration corresponding to the extrusion die, for example round as in FIG. 4.

Next, as shown in FIG. 5(b), a plurality of discrete feed passageways 2 having a circular section, respectively are drilled from one end surface 11 of the die body 1 towards the opposed end surface 12 at predetermined intervals, in parallel with one another and to a predetermined depth with a tapered inner end 20.

Then, as shown in FIG. 5(c), in the other surface 12 of the die body 1, there is formed the grid network of interconnected pooling slots 3 having a shape roughly corresponding to the cross-sectional shape of walls $H_1$ of the honeycomb structure H, and having a width larger than the thickness of walls $H_1$.

The interconnected pooling slots 3 are formed so that the alternate intersections thereof are communicated with the ends of the feed passages 2 as shown in FIG. 3 and discussed above.

Since the interconnected pooling slots 3 are not covered at this stage, they can be readily formed into the plane surface 12. Therefore, they can be easily made by any well known process such as end milling, metal slitting sawing, electric discharge machining, ultrasonic machining and dicing. However formed, the pooling slots surround the resulting columns 30 which are an integral part of die body.

Next in the process is the step of securely forming the discrete platelets 40, for example as shown in FIGS. 5(f)–(h).

As shown in FIG. 5(f), a separate nonintegral metallic plate 4 (FIG. 5(c)) made of alloy tool steel, for example, is disposed on the end surface 12, through a brazing material 6 made of copper, for example (FIG. 5(d)), to completely cover the interconnected pooling slots 3.

It is preferable to give a copper plating to the end surface 12 and the surface of the plate 4 to be bonded before heating to obtain better bonding. In this case, a silver-alloy brazing material such as the one containing 71 to 73% silver, 0.25 to 0.5% lithium, and copper as the remainder is used.

Then, the die body 1 with the metallic plate 4 so disposed thereon, is heated up to about 1000° C. within a vacuum furnace, and the brazing material 6 melts to securely join the die body 1 and the metallic plate 4 firmly and permanently as shown in FIG. 5(g).

At this time, the above-described smooth transitions 50 are formed by the molten brazing material 6 filling the rectangular corners at the junctures of the pooling slots 3 and the metallic plate 4 due to surface tension thereof. Since these corners are filled by the tapered brazing material 6, the extrudable material will flow smoothly along the tapered surface of the brazing material 6.

Although a thickness of about 1 mm is sufficient for the metallic plate 4 under some circumstances, such a plate is in danger of being distorted while being secured on the end surface 12 of the die body 1 through a brazing material. Therefore, it is more practical and preferable in some instances for the metallic plate to be initially larger than 1 mm, for example 3 mm. Such a metallic plate, after being joined, may then be ground to a required thickness.

Furthermore, metallic plate 4 can be securely joined to die body 1 by any other process such as diffusion welding, electron beam welding, resistance welding, ultrasonic welding and clamps.

In the following step, as shown in FIG. 5(h), the above described grid network of interconnected extrusion slots 5 having the same shape and size as the cross-sectional shape of the walls $H_1$ of the honeycomb structure H (FIG. 4) is formed in the metallic plate 4 in registration with the network of pooling slots 3 which respectively superpose slots 5.

The interconnected extrusion slots 5 are formed by means of electric discharge machining, cutting machining, ultrasonic machining, rap machining, etching machining, etc.

Then, the die body 1 wherein the interconnected extrusion slots 5 are formed, is heat treated to improve the hardness thereof.

As described above, the pooling slots 3 are formed in the open end surface 12 of the die body 1 so that the pooling slots 3 can be easily perforated therein. Therefore, even when the die body has a large diameter or when the interconnected extrusion slots 5 are close to one another, pooling slots 3 having the precise shape and size can be formed at predetermined positions, without deviation, in a short working time.

Since metallic plate 4 is thin, extrusion slots 5 can be easily formed therethrough.

According to the present invention, since the die body 1 and the metallic plate 4 provided with the interconnected extrusion slots 5 are prepared separately, the most suitable materials therefor can be advantageously selected according to desired characteristics for die body 1 and metallic plate 4, respectively. For example, the metallic plate 4 is made of an abrasion resistant material and the die body 1 is made of material having excellent tensile strength.

The feed passages, the pooling slots and the interconnected extrusion slots can be formed in an order other than that described above. For example, instead of feed passageways 2 being formed prior to pooling slots 3 they can alternatively be formed at any step subsequent to forming the interconnected pooling slots 3. It may be especially advantageous to wait until after heat-treating the obtained die body and the metallic plate into high hardness, to form the feed passageways 2 so that there is no possibility of the size of the feed passageways being changed by the heat treatment.

Also, by the method of the present invention, extrusion dies for forming honeycomb structures can be provided with feed passageways of various shapes such as a square, round, triangular and hexagonal shape.

By the extrusion die obtained by the method of the present invention, the honeycomb structure having about 200 to 800 cells per square inch which are equal to the number of the platelets 40 of the die, can be produced. In this case, the proper size of each of the feed passages, the pooling slots and the extrusion slots is as follows.

feed passage:
  0.7 mm to 1.8 mm in diameter
  13.0 mm to 16.0 mm in depth
pooling slot:
  0.2 mm to 0.6 mm in width
  1.0 mm to 3.0 mm in depth
extrusion slot:
  0.1 mm to 0.4 mm in width
  0.7 mm to 3.0 mm in depth For example, in this embodiment, the extrusion die comprising a large number of feed passages, each of which is 1.3 mm in diameter and 15.0 mm in depth, pooling slots, each of which is 0.3 mm in width and 1.5 mm in depth and extrusion slots, each of which is 0.15 mm in width and 1.0 mm in depth, was formed for producing the honeycomb structure having 400 cells per square inch.

As described above, according to the present invention, the die body provided with the feed passageways and the pooling slots, and the metallic plate provided with the interconnected extrusion slots can be formed from different materials. And they are joined to form a die assembly.

According to the present invention, the interconnected pooling slots can be formed in one of the plane end surfaces of the die body, and therefore, the pooling slots can be readily formed easily. Furthermore, the interconnected pooling slots can be formed precisely at predetermined positions with a predetermined shape and size.

Moreover, since the grid of interconnected extrusion slots 5 is formed in a thin metallic plate, formation of the slots is also easily and readily accomplishable.

Accordingly, the method of the present invention can be effectively applied to making an extrusion die according to this invention for producing a honeycomb structure useful as a catalyst support in an exhaust system of an automobile or the like.

The contents of applicant's priority document referenced in the declaration attached to this application is hereby incorporated hereinto by reference.

In keeping with the foregoing description of the invention, it will be apparent to one of ordinary skill in the art that many changes and modifications can be made thereto without departing from the spirit or scope of the invention encompassed by the following claims.

What is claimed is:

1. A method for producing an extrusion die to be used in forming a honeycomb structure provided with numerous axially extending passages which are separated by thin walls, comprising the steps of:

preparing from a single metallic block a die body having opposing end surfaces and a shape and size corresponding to those desired for said extrusion die, forming numerous discrete initial feed passageways in said die body for initially receiving and feeding an extrudable material of said honeycomb structure and interconnected pooling slots for pooling and distributing said extrudable material directly fed from said feed passageways temporally, said feed passageways being formed from one of said end surfaces of said die body towards the other end surface opposed to said one end surface in an axial direction of said die body at predetermined intervals to a predetermined depth, said interconnected pooling slots being formed from said other end surface of said die body towards said one end surface thereof to the level of said predetermined depth, the inner end of each of said feed passageways being directly communicated with said pooling slots, securing a metallic plate directly to said other end surface of said die body to cover said pooling slots, and forming interconnected extrusion slots in said metallic plate so as to be respectively narrower than but in register and communicated with said interconnected pooling slots for extruding said extrudable material distributed through said pooling slots, said interconnected extrusion slots having the same shape and width as a transverse cross section of said walls of said honeycomb structure.

2. A method as in claim 1, wherein:

said interconnected pooling slots have a shape corresponding to the cross sectional shape of said walls of said honeycomb structure and each of said pooling slots has a width larger than the thickness of said walls.

3. A method for producing an extrusion die useful in making a honeycomb structure having numerous discrete through-holes separated by walls, comprising the steps of:

forming in one surface of a metallic die body a network of pooling slots interconnected throughout said network and having a depth extending from said one surface inwardly toward an opposed surface to a certain level, securing a metallic plate directly to said one surface to cover all of said slots, forming through said plate a network of interconnected extrusion slots in communication with said pooling slots for extruding said walls, and forming numerous discrete feed passageways for initially receiving extrudable material and feeding same to said pooling slot network, said passageways extending from said opposed surface inwardly toward said one surface to the said level of said pooling slots for direct communication therewith inside said body, said pooling and extrusion slots being formed to cause extrudable material received by the pooling slots from said feed passageways to be spread throughout said pooling slot network so that said material can be extruded continuously through the whole of said extrusion slot network to make said walls solid.

4. A method for producing an extrusion die useful to make a honeycomb structure, comprising the steps of:

forming on one surface of a metallic die body a multiplicity of discrete columns extending perpendicular from said surface and having outer ends of given size and forming a network of pooling slots interconnected throughout said network, forming on said outer column ends respective discrete metallic platelets each having an area larger than the respective outer column end and together forming between themselves a network of interconnected criss-crossing extrusion slots forming a multiplicity of intersections and being coextensive with said pooling slot network with the extrusion slots being substantially narrower than their respective pooling slots with which they communicate, and forming in said die body to a depth of about 13 mm. to about 16 mm. a multiplicity of discrete feed passageways which are substantially less in number than the number of extrusion slot intersections but substantially wider than said pooling slots and which communicate directly with said pooling slots.

5. A method as in claim 4 wherein said discrete platelets are formed by first securing a metallic plate to said die body to cover all of said outer ends of said columns and then dividing said plate into said discrete platelets to form said extrusion slot network.

6. A method as in claim 4 or 5 wherein said columns and discrete platelets are formed with a density in the range of about 200 to about 800 per square inch.

7. A method as in claim 1, 2, 3 or 5 including selecting said plate to have a thickness substantially greater than a predetermined desired thickness to prevent possible distortion of said plate during said securing thereof over said pooling slots, and then grinding the secured plate to said desired thickness.

8. A method as in claim 1, 2, 3, 4 or 5 wherein said feed passageways are formed prior to said forming of said pooling slots.

9. A method as in claim 8 including hardening said die after the said forming of said extrusion slots.

10. A method as in claim 1, 2, 3, 4 or 5 wherein said feed passageways are formed subsequent to said forming of said pooling slots.

11. A method as in claim 9 wherein said feed passageways are formed after said forming of said extrusion slots.

12. A method as in claim 11 including hardening said die between the said forming of said extrusion slots and feed passageways.

13. A method as in claim 1, 2, 3, 4 or 5 wherein:
said interconnected pooling slots are formed by electric discharge machining, end milling, metal slitting sawing, ultrasonic machining or dicing.

14. A method as in claim 1, 2, 3 or 5 wherein:
said metallic plate is secured to said the other end surface of said die body by brazing, diffusion welding, electron beam welding, resistance welding, ultrasonic welding or clamping.

15. A method as in claim 1, 2, 3, 4 or 5 including hardening said die.

16. A method as in claim 1, 2, 3, 4 or 5 wherein each said feed passageway is formed at its inner end to make a smooth converging transition into a said pooling slot.

17. A method as in claim 16 wherein the outer end of each said pooling slot is formed to make a smooth converging transition to its respective extrusion slot.

18. A method as in claim 1, 2, 3, 4 or 5 including forming a smooth converging transition between the respective pooling and extrusion slots.

19. A method as in claim 1, 2, 3, 4 or 5 wherein each of said pooling slots interconnects a plurality of others of said pooling slots at respective intersections and wherein said feed passageways and pooling slots are formed to cause said feed passageways to communicate with said pooling slots at at least certain of said pooling slot intersections.

20. A method as in claim 19 wherein said pooling slots are formed in a rectangular grid network and said feed passageways communicate with said pooling slots at alternate ones of said intersections in both coordinate directions of said rectangular grid network.

21. A method as in claim 20 wherein said pooling and extrusion slots are formed in registering square grid networks one of which superposes the other.

22. A method as in claim 1, 2, 3 or 5 including selecting said plate and die body from metallic materials having differing characteristics.

23. A method as in claim 22 wherein the material of said plate is selected for its abrasion resistance.

24. A method as in claim 22 wherein the material of said die body is selected for its strength.

25. A method as in claim 24 wherein the material of said plate is selected for its abrasion resistance.

26. An extrusion die made in accordance with the process of claim 25.

27. A method as in claim 1, 2, 3, or 5 wherein the said securing of said metallic plate is effected by heating said die block and plate with copper brazing material between them until the brazing material melts and fills rectangular corners at the junctures of the plate and die block.

28. An extrusion die made in accordance with the process of claim 1, 2, 3, 4 or 5.

29. An extrusion die for making a honeycomb structure, comprising:
an integral metallic die body having two opposed surfaces from one of which a multiplicity of discrete feed passageways extend inwardly to a level of about 13 mm. to about 16 mm. toward the other of said surfaces and having in said other surface a grid network of criss-crossing pooling slots running transverse to said passageways and forming a multiplicity of intersections and being interconnected throughout said network and extending from said other surface toward said one surface to said level at which said passageways meet said slots for direct communication, said pooling slots being formed by individual columns integral with said die body,
the number of said feed passageways being substantially less than the number of said pooling slot intersections, and
a multiplicity of discrete metallic platelets each larger than said columns in transverse dimensions and nonintegral with said die body but respectively secured permanently to said columns and together forming a grid network of interconnected extrusion slots respectively registering on said pooling slots but having a width substantially narrower than said pooling slots.

30. A die as in claim 29 wherein said platelets are of an abrasion resistant material.

31. A die as in claim 29 or 30 wherein said die body is characterized by its strength.

32. A method as in claim 1 or 2 wherein the said securing of said metallic plate is effected by plating each of the said die block and plate with copper, interposing a silver alloy brazing material between said copper platings of said die block and plate and heating said die block and plate plated with copper together with said silver-alloy brazing material.

33. A method as in claim 17 wherein said smooth converging transition is formed by a silver-alloy brazing material which is interposed between said other end surface of said die body and said metallic plate in order to secure said metallic plate to said die body by brazing.

34. A method as in claim 1, 2 or 3 wherein said feed passageways are formed so as to have a diameter of about 0.7 mm. to about 1.8 mm. and a depth of about 13.0 mm. to about 16.0 mm.

35. A method as in claim 1, 2, 3, 4 or 5 wherein said pooling slots are formed so as to have a width of about 0.2 mm. to about 0.6 mm. and a depth of about 1.0 mm. to about 3.0 mm.

36. A method as in claim 1, 2, 3, 4 or 5 wherein said extrusion slots are formed so as to have a width of about 0.1 mm. to about 0.4 mm. and a depth of about 0.7 mm. to about 3.0 mm.

37. A die as in claim 29, 30 or 31 wherein the inner end of each of said feed passageways smoothly converges into said pooling slots.

38. A die as in claim 29, 30 or 31 wherein the outer end of each of said pooling slots smoothly converges into a respective extrusion slot.

39. A die as in claim 29, 30 or 31 further comprising a smooth converging transition portion made of a silver-alloy brazing material, which is formed between the outer end of each said pooling slot and the opposed inner end of each said extrusion slot.

40. A die as in claim 29, 30 or 31 wherein said feed passageways have a diameter of about 0.7 mm. to about 1.8 mm,
    said pooling slots have a width of about 0.2 mm. to about 0.6 mm. and a depth of about 1.0 mm. to about 3.6 mm., and
    said extrusion slots have a width of about 0.1 mm. to about 0.4 mm. and a depth of about 0.7 mm. to about 3.0 mm.

41. A die as in claim 40 wherein the number of said discrete platelets is about 200 to about 800 per square inch.

42. A die as in claim 29, 30 or 31 wherein the number of said discrete platelets is about 200 to about 800 per square inch.

43. A die as in claim 42 wherein said feed passageways have a width of about 0.7 mm. to about 1.8 mm.

44. A die as in claim 29, 30 or 31 wherein said feed passageways are regularly spaced apart.

45. A die as in claim 29, 30 or 31 wherein the number of feed passageways is about one-half of the number of said pooling slot intersections.

46. A method as in claim 1, 2 or 3 wherein said feed passageways are formed to a depth of about 13 mm. to about 16 mm. and in a number substantially less than the number of intersections of said interconnected extrusion slots.

47. A method as in claim 46 wherein said feed passages are formed to a width of about 0.7 mm. to about 1.8 mm.

48. A method as in claim 1 or 3, wherein:
    said feed passageways are formed so as to have a depth of about 13.0 mm to about 16.0 mm and so as to be opposed to and communicated with every other intersection of said pooling slots; and
    said metallic plate is secured to said other end surface of said die body by plating each of said die body and said metallic plate with copper, interposing a silver alloy brazing material between said copper platings of said die body and said metallic plate and heating said die body and said metallic plate plated with copper together with said silver-alloy brazing material.

49. A method as in claim 4, wherein:
    said metallic platelets are secured to said outer column ends by plating each of said outer column ends and said metallic platelets with copper, interposing a silver alloy brazing material between said copper platings and heating said column ends and said platelets plated with copper together with said silver alloy brazing material.

* * * * *